A. L. THOMAS, G. J. THOMAS & T. N. THOMAS.
Improvement in Three-Horse Equalizer.
No. 126,998. Patented May 21, 1872.
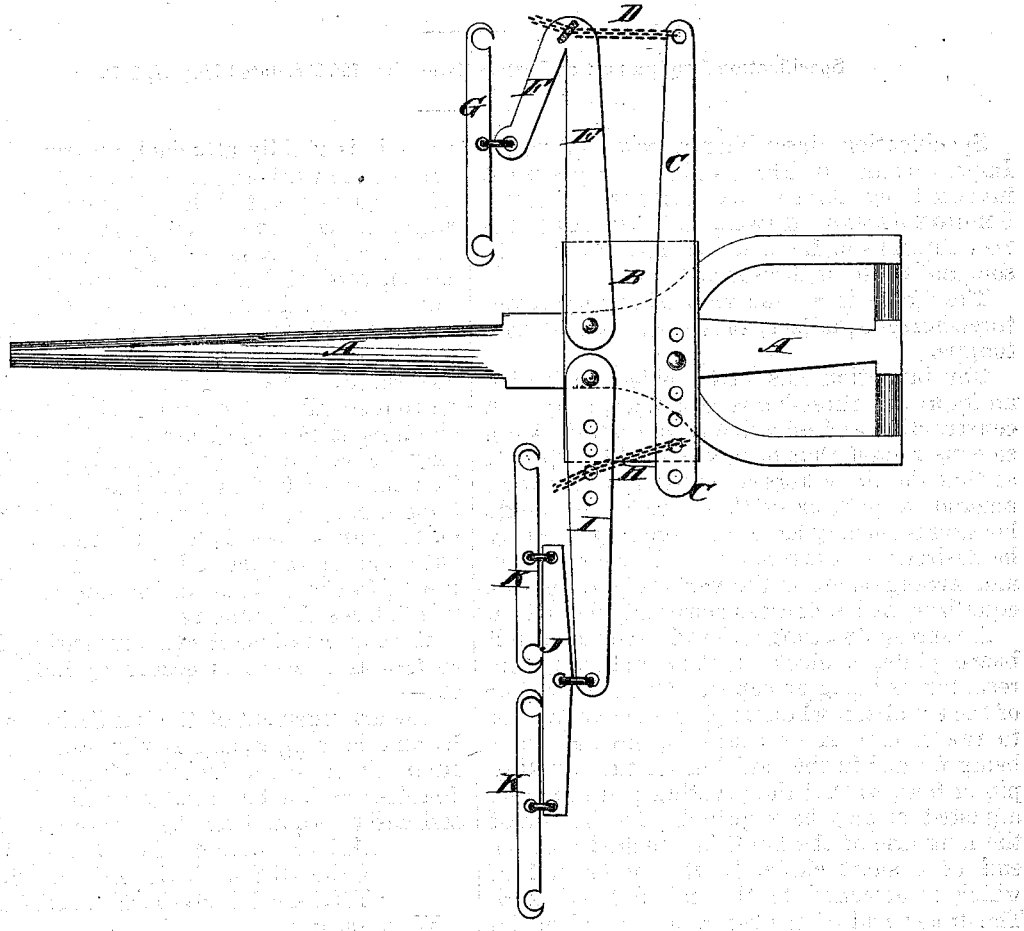
Witnesses:
P. C. Dieterich
N. A. Graham
Inventor:
A. L. Thomas
G. J. Thomas
T. N. Thomas
Per
Attorneys.

UNITED STATES PATENT OFFICE.

ADAM LAFAYETTE THOMAS, GEORGE JAMES THOMAS, AND THOMAS NEWTON THOMAS, OF LEE'S SUMMIT, MISSOURI.

IMPROVEMENT IN THREE-HORSE EQUALIZERS.

Specification forming part of Letters Patent No. 126,998, dated May 21, 1872.

Specification describing a new and useful Improvement in Three - Horse Equalizers, invented by ADAM LAFAYETTE THOMAS, GEORGE JAMES THOMAS, and THOMAS NEWTON THOMAS, of Lee's Summit, county of Jackson, and State of Missouri.

The figure is a plan view of our improved three-horse equalizer, shown as applied to a tongue.

Our invention has for its object to furnish an improved three-horse equalizer, simple in construction and effective in operation, being so constructed that it may be readily adjusted so that the three horses may all have an equal amount to pull, or so that either the single horse or team may have the advantage, as may be desired; and it consists in the construction and arrangement of the various parts of the equalizer, as hereinafter more fully described.

A represents a tongue, to which or to a small board, plate, or block, B, the equalizer is represented as being attached. C is the rear bar of the equalizer, which is pivoted near one end to the tongue A or board B, several holes being formed in the said bar for the pivoting pin or bolt, so that the pivoting point may be adjusted as may be required. To the end of the long arm of the bar C is attached the rear end of a short chain, D, the other end of which is attached to the end of the bar E. The inner end of the bar E is pivoted to the tongue A or board B, a little in front of the bar C. Upon the outer end of the bar E is formed, or to it is rigidly attached, an arm, F, which projects inward and forward, and to the end of which is pivoted the whiffletree G for the single horse. To the short arm of the bar C is attached the rear end of the short chain H, the forward end of which is attached to the bar I. Several holes are formed in the bars C and I, for the attachment of the chain H, so that the position of said chain may be adjusted as desired. The chains D H are designed to be connected to the bars C E I by means of clevises, so that the length of the said chains may be conveniently adjusted, as required. The inner end of the bar I is pivoted to the tongue A or board B directly opposite the end of the bar E, as shown in the figure. To the outer end of the bar I is pivoted the doubletree J, to the ends of which are pivoted the whiffletrees K for the team.

Having thus described my invention, I claim as new and desire to secure by Letters Patent—

The arrangement of the bar C, chains D and H, and bars E, F, and I with each other, to adapt them to receive the whiffletree G and double-tree J, substantially as herein shown and described, and for the purpose set forth.

ADAM LAFAYETTE THOMAS.
GEORGE JAMES THOMAS.
THOMAS NEWTON THOMAS.

Witnesses:
E. P. HOLBERT,
W. H. H. MEYERS.